(12) United States Patent
Higashikawa et al.

(10) Patent No.: US 8,183,817 B2
(45) Date of Patent: May 22, 2012

(54) APPARATUS FOR SWITCHING WINDINGS OF AC THREE-PHASE MOTOR

(75) Inventors: Koji Higashikawa, Fukuoka (JP); Kenji Yamada, Fukuoka (JP); Katsutoshi Yamanaka, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 184 days.

(21) Appl. No.: 12/789,385

(22) Filed: May 27, 2010

(65) Prior Publication Data

US 2010/0237815 A1 Sep. 23, 2010

Related U.S. Application Data

(63) Continuation of application No. PCT/JP2008/071660, filed on Nov. 28, 2008.

(30) Foreign Application Priority Data

Dec. 27, 2007 (JP) ................................. 2007-336294

(51) Int. Cl.
H02P 27/04 (2006.01)
(52) U.S. Cl. .................... 318/807; 318/400.21; 318/801; 318/751
(58) Field of Classification Search ............. 318/801, 318/807, 751, 400.21, 771, 772, 794, 784, 318/778, 779
See application file for complete search history.

(56) References Cited

U.S. PATENT DOCUMENTS

| 4,384,312 | A | * | 5/1983 | Fry ................................ 361/24 |
| 4,467,257 | A | * | 8/1984 | Douthart et al. .............. 318/774 |
| 5,212,436 | A | * | 5/1993 | Nacewicz et al. ............. 318/788 |
| 5,227,710 | A | * | 7/1993 | Lewus ........................... 318/781 |
| 5,300,871 | A | * | 4/1994 | Bucher et al. ................. 318/794 |
| 5,514,943 | A | * | 5/1996 | Shapess ......................... 318/772 |
| 6,445,101 | B2 | * | 9/2002 | Ley ................................ 310/184 |
| 6,707,214 | B1 | * | 3/2004 | Fei ................................ 310/184 |
| 6,815,926 | B2 | * | 11/2004 | Fei et al. ....................... 318/773 |
| 6,847,185 | B2 | * | 1/2005 | Kume et al. ................... 318/732 |
| 6,856,038 | B2 | * | 2/2005 | Rebsdorf et al. ................ 290/44 |
| 7,196,490 | B2 | * | 3/2007 | Kim et al. ...................... 318/751 |
| 7,746,025 | B2 | * | 6/2010 | Choi et al. ..................... 318/772 |

FOREIGN PATENT DOCUMENTS

| JP | 57-41498 U | 8/1980 |
| JP | 56-153990 | 11/1981 |
| JP | 2003-111492 | 4/2003 |
| JP | 2007-236179 | 9/2007 |

OTHER PUBLICATIONS

International Search Report for International Application No. PCT/JP2008/071660 Dec. 27, 2007.
Written Opinion of the International Searching Authority for International Application No. PCT/JP2008/071660 Dec. 27, 2007.

* cited by examiner

*Primary Examiner* — Rita Leykin
(74) *Attorney, Agent, or Firm* — Ditthavong Mori & Steiner, P.C.

(57) ABSTRACT

A winding switching apparatus for switching windings of an AC three-phase motor is provided. In each winding switching section of the winding switching apparatus, a positive-side charging resistor, a negative-side charging resistor, and a capacitor are connected in series between a positive-side DC bus and a negative-side DC bus of an inverter; the positive side of the capacitor is connected to the cathodes of respective diodes of a diode unit; and switching between high-speed windings and low-speed windings is carried out, with a capacitor potential being the same as an inverter DC bus voltage. A state detector and a comparator are also provided for each winding switching section to detect erroneous wiring and component abnormalities.

5 Claims, 4 Drawing Sheets

APPARATUS FOR SWITCHING WINDINGS OF AC THREE-PHASE MOTOR

CROSS-REFERENCES TO RELATED APPLICATIONS

The present application is a continuation application of PCT/JP2008/071660, filed Nov. 28, 2008, which claims priority to Japanese Patent Application No. 2007-336294, filed Dec. 27, 2007. The contents of these applications are incorporated herein by reference in their entirety.

BACKGROUND OF THE INVENTION

1. Field of the Invention

The present invention relates to a winding switching apparatus for switching windings of an alternating current (AC) three-phase motor to extend the range of speed control.

2. Discussion of the Background

For driving devices for main shafts of machine tools and vehicles which are driven by inverter apparatuses, winding switching methods have been adopted to produce a sufficiently large torque in a low-speed range and allow operation in a high-speed range.

For example, U.S. Pat. No. 6,847,185 B2 (family member: Japanese Unexamined Patent Application Publication No. 2003-111492) describes a winding switching apparatus that includes an AC motor having external terminals for switching windings, an inverter unit configured to supply a variable voltage having a variable frequency to the AC motor, and a winding switching unit having semiconductor switches.

SUMMARY OF THE INVENTION

According to one aspect of the present invention, a winding switching apparatus for switching windings of an AC three-phase motor includes an AC three-phase motor having windings for the respective three phases, the windings each having an intermediate tap, a winding start terminal, and a winding end terminal that are provided outside the AC three-phase motor; an inverter configured to supply a variable voltage having a variable frequency to the winding start terminals; a plurality of winding switching sections configured to switch the intermediate taps and the winding end terminals; and a plurality of drive circuits each configured to receive a drive signal from the inverter and control the corresponding winding switching section. The winding switching sections each include a diode unit having three diodes whose cathodes are connected to each other; a switching unit having three power semiconductor switches and three diodes connected in inverse parallel to the respective power semiconductor switches, wherein emitters of the respective power semiconductor switches are connected to each other, collector of the respective power semiconductor switches are connected to respective anodes of the diodes of the diode unit, and connection points between the respective collectors of the power semiconductor switches and the corresponding anodes of the diodes of the diode unit are connected to the respective winding end terminals or to the respective intermediate taps; a potential fixing unit having a positive-side charging resistor, a capacitor, and a negative-side charging resistor, wherein one end of the positive-side charging resistor is connected to a positive-side DC bus of the inverter, the other end of the positive-side charging resistor is connected to a positive side of the capacitor, a negative side of the capacitor is connected to one end of the negative-side charging resistor, the other end of the negative-side charging resistor is connected to a negative-side DC bus of the inverter, and the positive side of the capacitor is connected to the cathodes of the respective diodes of the diode unit; and a protective diode unit having three diodes whose anodes are connected to the negative side of the capacitor of the potential fixing unit and whose cathodes are connected to the respective connection points between the respective anodes of the diodes of the diode unit and the corresponding collectors of the power semiconductor switches of the switching unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Embodiments will now be described with reference to the accompanying drawings, wherein like reference numerals designate corresponding or identical elements throughout the various drawings. The description of such elements will not be repeated.

Although an actual inverter has many functions and components, only those related to embodiments of the present invention are illustrated in the drawings and will be described.

Figure 1:
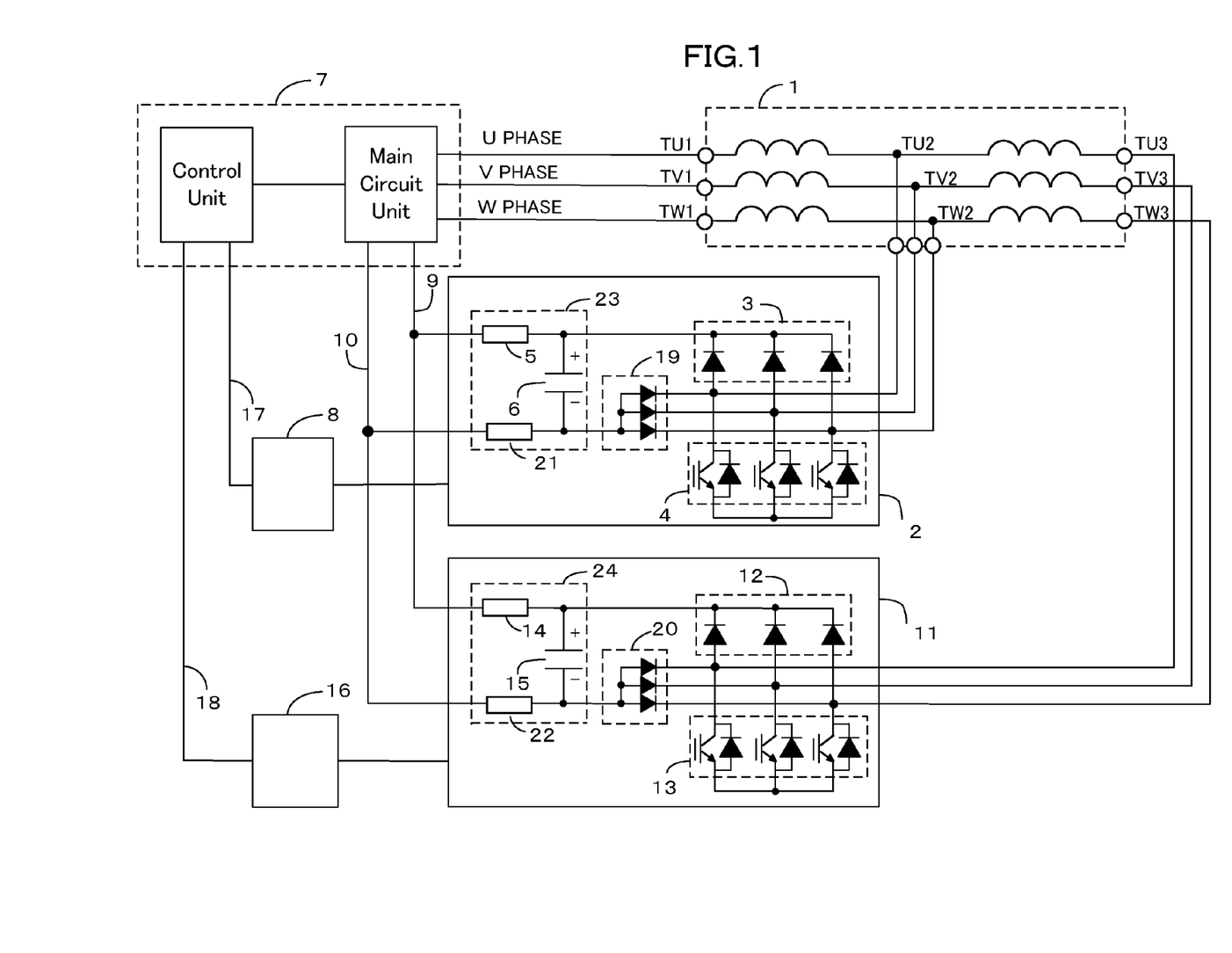
FIG. 1 is a diagram illustrating a winding switching apparatus for switching windings of an AC three-phase motor according to a first embodiment of the present invention.

FIG. 1 is a diagram illustrating a winding switching apparatus for switching windings of an AC three-phase motor according to a first embodiment of the present invention. Referring to FIG. 1, reference numeral 1 denotes an AC three-phase motor, reference numerals 2 and 11 denote winding switching sections, reference numerals 3 and 12 denote diode units, reference numerals 4 and 13 denote switching units, reference numerals 5 and 14 denote positive-side charging resistors, reference numerals 6 and 15 denote capacitors, reference numeral 7 denotes an inverter, reference numerals 8 and 16 denote drive circuits, reference numeral 9 denotes a positive-side direct current (DC) bus, reference numeral 10 denotes a negative-side DC bus, reference numerals 17 and 18 denote drive signals, reference numerals 19 and 20 denote protective diode units, reference numerals 21 and 22 denote negative-side charging resistors, and reference numeral 23 and 24 denote potential fixing units.

The inverter 7 includes a control unit and a main circuit unit. The AC three-phase motor 1 has windings for the respective three phases. Intermediate taps (TU2, TV2, and TW2), winding start terminals (TU1, TV1, and TW1), and winding end terminals (TU3, TV3, and TW3) of the respective windings are provided outside the AC three-phase motor 1.

The winding start terminals (TU1, TV1, and TW1) are connected to the inverter 7, the winding end terminals (TU3, TV3, and TW3) are connected to the winding switching section 11, and the intermediate taps (TU2, TV2, and TW2) are connected to the winding switching section 2.

The drive circuit 8 receives the drive signal 17 from the control unit of the inverter 7, drives the winding switching section 2, and outputs a control signal to the switching unit 4. Similarly, the drive circuit 16 receives the drive signal 18 from the control unit of the inverter 7, drives the winding switching section 11, and outputs a control signal to the switching unit 13.

First, the winding switching section 2 will be described. The winding switching section 2 includes the diode unit 3, the switching unit 4, the potential fixing unit 23, and the protective diode unit 19.

The diode unit 3 includes three diodes whose cathodes are connected to each other.

The switching unit 4 includes three power semiconductor switches and three diodes connected in inverse parallel to the respective power semiconductor switches. The collectors of the power semiconductor switches are connected to the respective anodes of the diodes of the diode unit 3, while the emitters of the power semiconductor switches are connected to each other.

Connection points between the respective anodes of the diodes of the diode unit 3 and the corresponding collectors of the power semiconductor switches of the switching unit 4 are connected to the respective intermediate taps (TU2, TV2, and TW2).

The potential fixing unit 23 includes the positive-side charging resistor 5, the capacitor 6, and the negative-side charging resistor 21. One end of the positive-side charging resistor 5 is connected to the positive-side DC bus 9 of the inverter 7, and the other end of the positive-side charging resistor 5 is connected to the positive side of the capacitor 6. The negative side of the capacitor 6 is connected to one end of the negative-side charging resistor 21, and the other end of the negative-side charging resistor 21 is connected to the negative-side DC bus 10. A connection point between the positive side of the capacitor 6 and the positive-side charging resistor 5 is connected to the cathodes of the diode unit 3.

The protective diode unit 19 includes three diodes whose anodes are connected to the negative side of the capacitor 6 and whose cathodes are connected to the respective intermediate taps (TU2, TV2, and TW2).

Although insulated gate bipolar transistors (IGBTs) are used here as the power semiconductor switches of the switching unit 4, any power semiconductor switches suitable for the voltage and current may be used.

The winding switching section 11 has the same configuration as that of the winding switching section 2. The winding switching section 11 includes the diode unit 12, the switching unit 13, the potential fixing unit 24, and the protective diode unit 20.

The diode unit 12 includes three diodes whose cathodes are connected to each other.

The switching unit 13 includes three power semiconductor switches and three diodes connected in inverse parallel to the respective power semiconductor switches. The collectors of the power semiconductor switches are connected to the respective anodes of the diodes of the diode unit 12, while the emitters of the power semiconductor switches are connected to each other.

Connection points between the respective anodes of the diodes of the diode unit 12 and the corresponding collectors of the power semiconductor switches of the switching unit 13 are connected to the respective winding end terminals (TU3, TV3, and TW3).

The potential fixing unit 24 includes the positive-side charging resistor 14, the capacitor 15, and the negative-side charging resistor 22. One end of the positive-side charging resistor 14 is connected to the positive-side DC bus 9 of the inverter 7, and the other end of the positive-side charging resistor 14 is connected to the positive side of the capacitor 15. The negative side of the capacitor 15 is connected to one end of the negative-side charging resistor 22, and the other end of the negative-side charging resistor 22 is connected to the negative-side DC bus 10. A connection point between the positive side of the capacitor 15 and the positive-side charging resistor 14 is connected to the cathodes of the diode unit 12.

The protective diode unit 20 includes three diodes whose anodes are connected to the negative side of the capacitor 15 and whose cathodes are connected to the respective winding end terminals (TU3, TV3, and TW3).

Although IGBTs are used here as the power semiconductor switches of the switching unit 13, any power semiconductor switches suitable for the voltage and current may be used.

When the switching unit 4 is turned on, an ON signal is output to all the power semiconductor switches of the switching unit 4. This allows current to flow through one or more power semiconductor switches to which a forward voltage is applied. Although no current flows through the other one or more power semiconductor switches to which a reverse voltage is applied, current flows through the corresponding one or more diodes connected in inverse parallel to the other one or more power semiconductor switches. Thus, the intermediate taps (TU2, TV2, and TW2) are shorted to each other.

When the switching unit 4 is turned off, an OFF signal is output to all the power semiconductor switches of the switching unit 4. This turns off all the power semiconductor switches of the switching unit 4, so that the intermediate taps (TU2, TV2, and TW2) are opened.

When the switching unit 13 is turned on, an ON signal is output to all the power semiconductor switches of the switching unit 13. This allows current to flow through one or more power semiconductor switches to which a forward voltage is applied. Although no current flows through the other one or more power semiconductor switches to which a reverse voltage is applied, current flows through the corresponding one or more diodes connected in inverse parallel to the other one or more power semiconductor switches. Thus, the winding end terminals (TU3, TV3, and TW3) are shorted to each other.

When the switching unit 13 is turned off, an OFF signal is output to all the power semiconductor switches of the switching unit 13. This turns off all the power semiconductor switches of the switching unit 13, so that the winding end terminals (TU3, TV3, and TW3) are opened.

Next, a high-speed operation of the AC three-phase motor 1 will be described. For the high-speed operation, the switching unit 4 is turned on and the switching unit 13 is turned off. This causes, through the switching unit 4, the intermediate taps (TU2, TV2, and TW2) to short each other to form a star connection composed of TU1-TU2, TV1-TV2, and TW1-TW2. Thus, as compared to the case where the winding end terminals (TU3, TV3, and TW3) are shorted, the number of winding segments can be reduced and a counter-electromotive force of the AC three-phase motor 1 can be suppressed. This allows a sufficient amount of current to flow and allows the AC three-phase motor 1 to operate at high speed.

For a low-speed operation of the AC three-phase motor 1, the switching unit 13 is turned on and the switching unit 4 is turned off. This causes, through the switching unit 13, the winding end terminals (TU3, TV3, and TW3) to short each other to form a star connection composed of TU1-TU3, TV1-TV3, and TW1-TW3. Thus, a sufficient torque can be produced by low-speed operation of the AC three-phase motor 1.

As described above, a wide range of output characteristics (i.e., a wide range of speed/torque control) can be achieved by controlling the switching unit 4 and the switching unit 13 depending on the speed of operation.

In the known winding switching methods described above, energy stored in motor inductance is released during transition of motor windings from an excited state to a non-excited state. This interferes with instantaneous switching of current and causes fluctuations in motor current. In the present invention, however, a charged capacitor is present in a winding switching section. This allows instantaneous switching of current, so that the motor current waveform of the switching operation is smoothed.

A description will now be given of why the presence of a charged capacitor in a winding switching section allows instantaneous switching of current.

At the time of winding switching, the amount of current remaining in motor windings can be rapidly reduced to zero by increasing the current reduction rate. A current reduction rate di/dt defined by temporal differentiation of current is expressed by Equation 1 below:

$$di/dt = V/L \qquad \text{Equation 1}$$

where V is a capacitor voltage and L is a motor winding inductance. Maintaining the capacitor voltage V at a high potential makes it possible to increase the current reduction rate and to rapidly reduce the amount of current to zero.

An operation for transition from low-speed windings to high-speed windings will now be described.

For transition from low-speed windings to high-speed windings, the switching unit 4 is turned on and the switching unit 13 is turned off. The capacitor 15 that is connected, through the positive-side charging resistor 14 and the negative-side charging resistor 22, between the positive-side DC bus 9 and the negative-side DC bus 10 of the inverter 7 is subjected to initial charging in advance. Then, when switching of motor windings is made, that is, when the switching unit 13 is turned off, energy stored in the motor inductance is absorbed through the diode unit 12 by the capacitor 15. Although this increases the voltage of the capacitor 15 to a level higher than the initial charging voltage (DC bus voltage), the current flowing through the motor windings is rapidly reduced to zero.

Figure 2A:
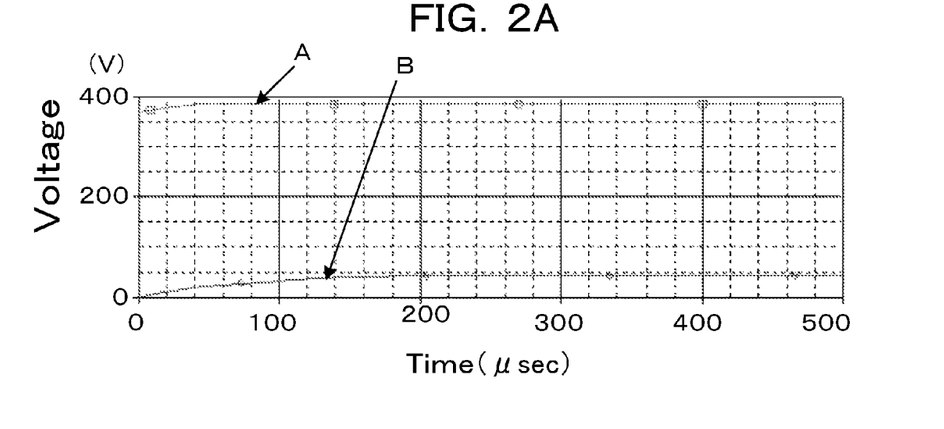
FIG. 2A and FIG. 2B are graphs showing operation waveforms (simulation waveforms) of a winding switching operation performed by the winding switching apparatus according to the first embodiment of the present invention.
Figure 2B:
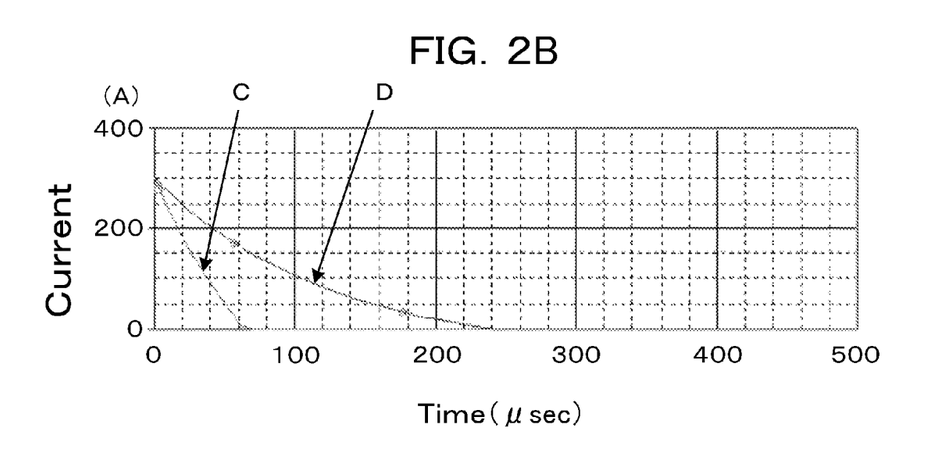

FIG. 2A and FIG. 2B are graphs showing operation waveforms (simulation waveforms) of a winding switching operation performed by the winding switching apparatus of the present embodiment. FIG. 2A shows capacitor voltage waveforms, and FIG. 2B shows waveforms of current flowing through motor windings. Referring to FIG. 2A, "A" indicates a capacitor voltage waveform for the present embodiment where an initial charging voltage is 350 V, and "B" indicates a capacitor voltage waveform for a known method where no initial charging is performed. Referring to FIG. 2B, "C" indicates a waveform of current flowing through motor windings in the present embodiment where an initial charging voltage is 350 V, and "C" indicates a waveform of current flowing through motor windings in the known method where no initial charging is performed.

When the initial charging voltage of the capacitor is 350 V, the current reduction rate is higher and the current is more rapidly reduced to zero, as compared to the case where the initial charging voltage of the capacitor is 0V. This shows that depending on whether the capacitor has been subjected to initial charging, the length of time before the current flowing through motor windings is reduced to zero is different.

When the switching unit 4 is in an OFF state, no motor current flows through the winding switching section 2. When the switching unit 4 is turned on, a common connection point of the power semiconductor switches of the switching unit 4 becomes a motor neutral point. Thus, motor current flows through the windings TU1-TU2, TV1-TV2, and TW1-TW2 of the AC three-phase motor 1, the power semiconductor switches of the switching unit 4, and the diodes connected in inverse parallel to these power semiconductor switches.

The same principle applies to the case of transition from high-speed windings to low-speed windings. An operation for transition from high-speed windings to low-speed windings will now be described.

For transition from high-speed windings to low-speed windings, the switching unit 13 is turned on and the switching unit 4 is turned off. The capacitor 6 that is connected, through the positive-side charging resistor 5 and the negative-side charging resistor 21, between the positive-side DC bus 9 and the negative-side DC bus 10 of the inverter 7 is subjected to initial charging in advance. Then, when switching of motor windings is made, that is, when the switching unit 4 is turned off, energy stored in the motor inductance is absorbed through the diode unit 3 by the capacitor 6. Although this increases the voltage of the capacitor 6 to a level higher than the initial charging voltage (DC bus voltage), the current flowing through the motor windings is rapidly reduced to zero.

When the switching unit 13 is turned on, a common connection point of the power semiconductor switches of the switching unit 13 becomes a motor neutral point. Thus, motor current flows through the windings TU1-TU3, TV1-TV3, and TW1-TW3 of the AC three-phase motor 1, the power semiconductor switches of the switching unit 13, and the diodes connected in inverse parallel to these power semiconductor switches.

With the configuration described above, it is possible to provide the winding switching apparatus capable of quickly switching windings of the AC three-phase motor.

Next, an operation of the protective diode units 19 and 20 will be described. If an abnormality occurs during motor drive and the main circuit unit of the inverter 7 is base-blocked, the protective diode units 19 and 20 secure a path for circulating current induced by motor inductance, so as to prevent the inverter 7, the winding switching section 2, and the winding switching section 11 from being damaged.

Even if an abnormality (e.g., motor lock) occurs during energization of the AC three-phase motor 1 and then the main circuit unit of the inverter 7 is base-blocked, since the protective diode units 19 and 20 are provided, energy Q generated by current flowing through the inductance of the motor windings is consumed by charging an electrolytic capacitor (not shown) in the main circuit unit of the inverter 7, the capacitor 6, and the capacitor 15. The energy Q is expressed by Equation 2 below:

$$Q = (1/2) \cdot L \cdot i^2 \qquad \text{Equation 2}$$

where L is the inductance of motor windings and i is current flowing through the motor windings.

An energy path will now be specifically described. Assume here that, at the intermediate tap TU2 of the motor winding for U phase, motor current flows in the direction from the AC three-phase motor 1 to the inverter 7. In this case, circulating current flows in a closed circuit starting and ending at the intermediate tap TU2. Specifically, circulating current flows from the intermediate tap TU2, passes through a freewheel diode in the inverter 7, charges the main circuit capacitor (electrolytic capacitor) having an impedance lower than that of the capacitor 6, flows through the negative-side DC bus 10 and the protective diode unit 19, and flows back to the intermediate tap TU2. If the protective diode unit 19 is not present, it is not possible to secure a path for the circulating current. Then as a result, since the energy Q generated by current flowing through the motor winding cannot be absorbed, the resulting rapid increase in voltage of the positive-side DC bus 9 of the inverter 7 damages the inverter 7 and the winding switching section 2.

To prevent such damage without the protective diode units 19 and 20, it is necessary to increase the resistance of the main circuit unit of the inverter 7 and that of the winding switching sections 2 and 11.

With the configuration described above, without increasing the resistance of the main circuit unit of the inverter 7, diode units 3 and 12, and switching units 4 and 13, it is possible to provide the winding switching apparatus capable of preventing damage caused by circulating current generated when a motor abnormality occurs.

The first embodiment discusses the case where one intermediate tap is provided for each phase winding of the AC three-phase motor 1. The same applies to the cases where more than one intermediate tap is provided for each phase winding of the AC three-phase motor 1.

For example, if two intermediate taps are provided for each phase winding of the AC three-phase motor 1, the number of winding switching sections is three. Likewise, for example, if three intermediate taps are provided for each phase winding of the AC three-phase motor 1, the number of winding switching sections is four. In other words, the number of winding switching sections is larger by one than that of intermediate taps provided for each phase winding of the AC three-phase motor 1. With this configuration, switching of windings can be made by appropriate switching of the winding end terminals and intermediate taps of respective phase windings of the AC three-phase motor 1.

Figure 3:
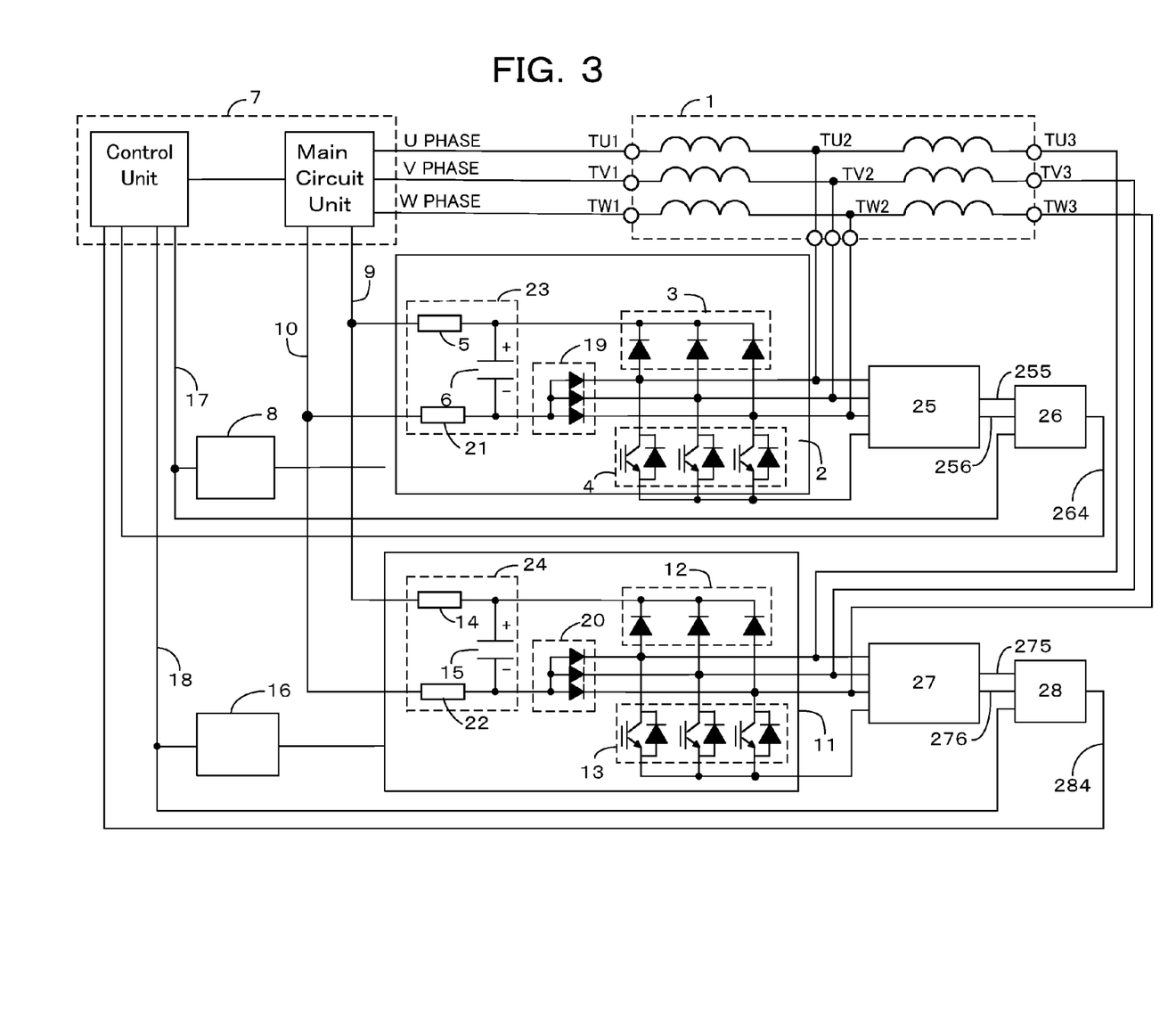
FIG. 3 is a diagram illustrating a winding switching apparatus for switching windings of an AC three-phase motor according to a second embodiment of the present invention.

FIG. 3 is a diagram illustrating a winding switching apparatus for switching windings of an AC three-phase motor according to a second embodiment of the present invention. Referring to FIG. 3, reference numerals 25 and 27 denote state detectors, reference numerals 26 and 28 denote comparators, reference numerals 255 and 275 denote winding-switching-section ON-state signals, reference numerals 256 and 276 denote winding-switching-section OFF-state signals, and reference numerals 264 and 284 denote winding-switching-section abnormal signals.

The present embodiment differs from the first embodiment in that the winding switching apparatus includes state detectors and comparators. Each state detector detects a conducting/non-conducting (cut-off) state or an ON/OFF state of each of the power semiconductor switches included in the switching unit of the winding switching section. Each comparator detects an abnormality in the winding switching section on the basis of a result of the detection made by the state detector and a drive signal output from the control unit of the inverter.

General operations of the state detectors and comparators will now be described.

The state detector 25 detects a conducting/non-conducting state or an ON/OFF state of each of the power semiconductor switches included in the switching unit 4, and outputs the winding-switching-section ON-state signal 255 and the winding-switching-section OFF-state signal 256 to the comparator 26. The winding-switching-section ON-state signal 255 goes high when all the power semiconductor switches in the switching unit 4 are in a conducting state. The winding-switching-section OFF-state signal 256 goes low when all the power semiconductor switches in the switching unit 4 are in a non-conducting state.

Similarly, the state detector 27 detects a conducting/non-conducting state or an ON/OFF state of each of the power semiconductor switches included in the switching unit 13, and outputs the winding-switching-section ON-state signal 275 and the winding-switching-section OFF-state signal 276 to the comparator 28. The winding-switching-section ON-state signal 275 goes high when all the power semiconductor switches in the switching unit 13 are in a conducting state. The winding-switching-section OFF-state signal 276 goes low when all the power semiconductor switches in the switching unit 13 are in a non-conducting state.

The comparator 26 detects the presence or absence of an abnormality in the winding switching section 2 on the basis of the winding-switching-section ON-state signal 255, the winding-switching-section OFF-state signal 256, and the drive signal 17 from the control unit of the inverter 7. If an abnormality in the winding switching section 2 is detected, the comparator 26 drives the winding-switching-section abnormal signal 264 high and outputs it to the control unit of the inverter 7.

Similarly, the comparator 28 detects the presence or absence of an abnormality in the winding switching section 11 on the basis of the winding-switching-section ON-state signal 275, the winding-switching-section OFF-state signal 276, and the drive signal 18 from the control unit of the inverter 7. If an abnormality in the winding switching section 11 is detected, the comparator 28 drives the winding-switching-section abnormal signal 284 high and outputs it to the control unit of the inverter 7.

The control unit of the inverter 7 inputs the winding-switching-section abnormal signal 264 and the winding-switching-section abnormal signal 284. If at least one of the winding-switching-section abnormal signals 264 and 284 is high, the control unit of the inverter 7 determines that an abnormality has occurred, and takes an appropriate action, such as cutting off the main circuit unit of the inverter 7.

Configurations and operations of a state detector and a comparator will now be described in detail.

Figure 4:
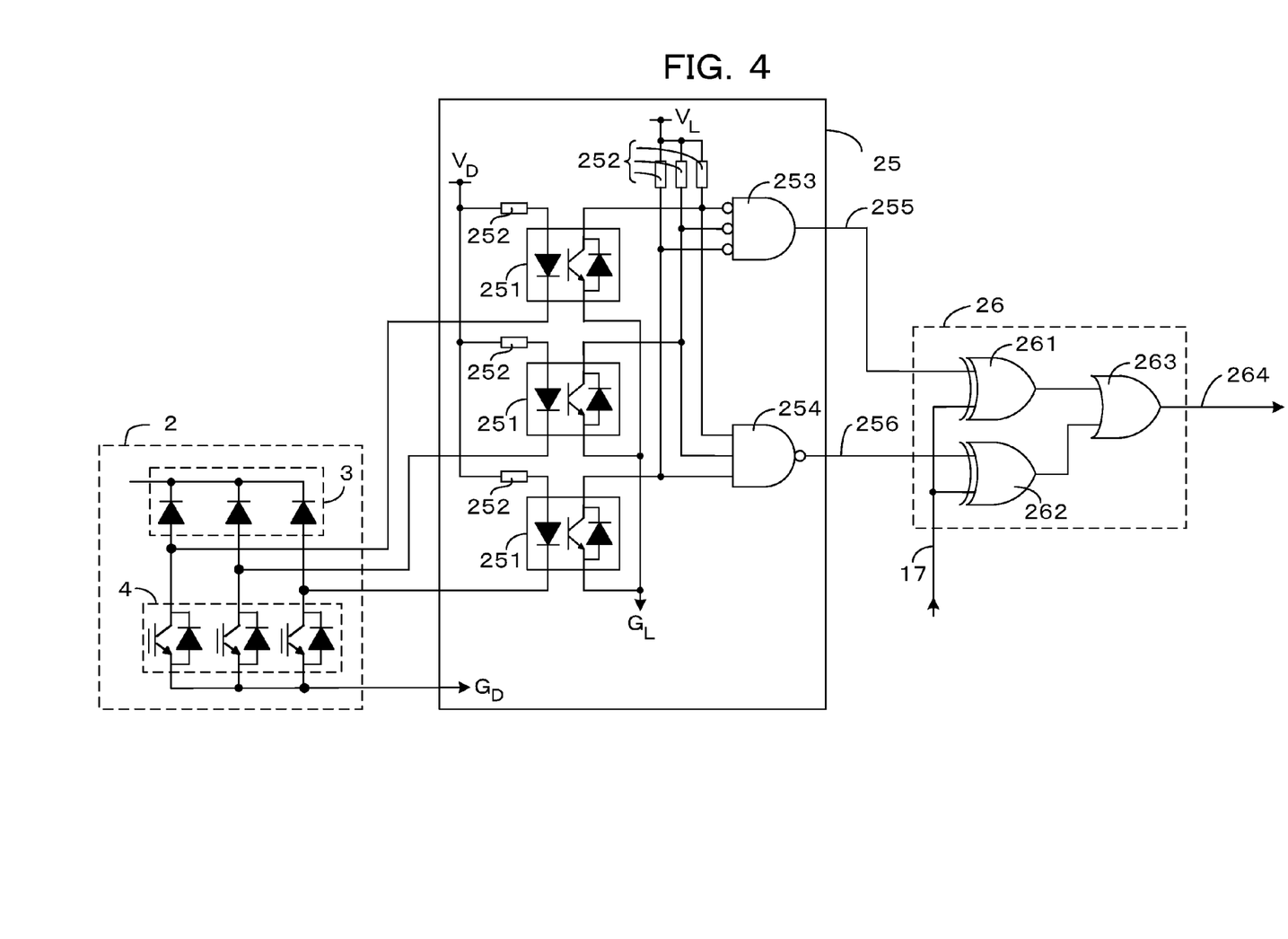
FIG. 4 is a diagram illustrating detailed circuit configurations of a state detector and a comparator included in the winding switching apparatus according to the second embodiment of the present invention.

FIG. 4 is a diagram illustrating detailed circuit configurations of a state detector and a comparator included in the winding switching apparatus of the present embodiment. Specifically, the state detector 25 and comparator 26 related to the winding switching section 2 are illustrated in FIG. 4. The state detector 27 and comparator 28 related to the winding switching section 11 will not be described here, as they are similar to the state detector 25 and the comparator 26.

Referring to FIG. 4, reference numeral 251 denotes three photo-couplers, reference numeral 252 denotes six pull-up resistors, reference numeral 253 denotes a logical negative OR (NOR) gate, reference numeral 254 denotes a logical negative AND (NAND) gate, reference numerals 261 and 262 denote logical exclusive OR (XOR) gates, and reference numeral 263 denotes a logical OR gate.

The configuration of the state detector 25 will now be described. The state detector 25 includes the three photo-couplers 251, the six pull-up resistors 252, the three-input NOR gate 253, and the three-input NAND gate 254.

The anodes of light-emitting diodes of the respective three photo-couplers 251 are connected through their corresponding pull-up resistors 252 to a gate-drive power source $V_D$ for the power semiconductor switches of the switching unit 4. The cathodes of the light-emitting diodes of the three photo-couplers 251 are connected to the respective collectors of the power semiconductor switches of the switching unit 4.

The emitters of the power semiconductor switches of the switching unit 4 are all connected to a gate-drive power-source ground $G_D$ and thus no particular operation is necessary here.

The emitters of photo-transistors of the respective three photo-couplers 251 are all connected to a control power-source ground $G_L$. The collectors of the photo-transistors of the three photo-couplers 251 are connected through their corresponding pull-up resistors 252 to a control power source $V_L$ and, at the same time, connected to their corresponding inputs of the NOR gate 253 and NAND gate 254.

The output of the NOR gate 253 is the winding-switching-section ON-state signal 255, and the output of the NAND gate 254 is the winding-switching-section OFF-state signal 256.

In the present embodiment, the state detector 25 uses the photo-couplers 251 to provide an insulating function. However, if the control unit and main circuit unit of the inverter 7 and the winding switching section 2 are operated at the same potential, it is not necessary that the state detector 25 provide an insulation function.

Next, the operation of the state detector 25 will be described.

When the power semiconductor switches of the switching unit 4 are turned on, current flows from the gate-drive power source $V_D$, through the pull-up resistors 252 and the photo-couplers 251, through the power semiconductor switches of the switching unit 4, to the gate-drive power-source ground $G_D$. This turns on the photo-transistors of the photo-couplers 251. Since this drives all the inputs of the NOR gate 253 and NAND gate 254 low, both the winding-switching-section ON-state signal 255 (i.e., the output of the NOR gate 253) and the winding-switching-section OFF-state signal 256 (i.e., the output of the NAND gate 254) go high.

When the power semiconductor switches of the switching unit 4 are turned off, no current flows through the light-emitting diodes of the photo-couplers 251, so that the photo-transistors of the photo-couplers 251 are also turned off. Since this drives all the inputs of the NOR gate 253 and NAND gate 254 high, both the winding-switching-section ON-state signal 255 (i.e., the output of the NOR gate 253) and the winding-switching-section OFF-state signal 256 (i.e., the output of the NAND gate 254) go low.

The configuration of the comparator 26 will now be described. The comparator 26 includes the XOR gate 261, the XOR gate 262, and the OR gate 263.

The XOR gate 261 inputs the winding-switching-section ON-state signal 255 and the drive signal 17, and outputs the XOR of the two input signals to the OR gate 263. The XOR gate 262 inputs the winding-switching-section OFF-state signal 256 and the drive signal 17, and outputs the XOR of the two input signals to the OR gate 263. The OR gate 263 inputs the output signals from the XOR gate 261 and the XOR gate 262. Then, the OR gate 263 outputs, as the winding-switching-section abnormal signal 264, the OR of the two input signals to the control unit of the inverter 7.

Next, the operation of the comparator 26 will be described.

When all the power semiconductor switches of the switching unit 4 are in a conducting state, both the winding-switching-section ON-state signal 255 and the winding-switching-section OFF-state signal 256 are high. Since the drive signal 17 is also high, the outputs of the XOR gate 261 and XOR gate 262 go low, so that the winding-switching-section abnormal signal 264 (i.e., the output of the OR gate 263) goes low.

When all the power semiconductor switches of the switching unit 4 are in a non-conducting state, both the winding-switching-section ON-state signal 255 and the winding-switching-section OFF-state signal 256 are low. Since the drive signal 17 is also low, the outputs of the XOR gate 261 and XOR gate 262 go low, so that the winding-switching-section abnormal signal 264 (i.e., the output of the OR gate 263) goes low.

Thus, when the winding switching section 2 is operating properly, the winding-switching-section abnormal signal 264 always goes low.

When the drive signal 17 is high, if not all the power semiconductor switches of the switching unit 4 are in a conducting state, the winding-switching-section ON-state signal 255 goes low and the winding-switching-section OFF-state signal 256 goes high. Since the drive signal 17 is high, the output of the XOR gate 261 goes high and the output of the XOR gate 262 goes low, so that the winding-switching-section abnormal signal 264 goes high.

When the drive signal 17 is low, if not all the power semiconductor switches of the switching unit 4 are in a non-conducting state, the winding-switching-section ON-state signal 255 goes low and the winding-switching-section OFF-state signal 256 goes high. Since the drive signal 17 is low, the output of the XOR gate 261 goes low and the output of the XOR gate 262 goes high, so that the winding-switching-section abnormal signal 264 goes high.

Thus, whenever an abnormality is detected in the winding switching section 2, the winding-switching-section abnormal signal 264 goes high.

Therefore, if the winding-switching-section abnormal signal 264 goes high while the control unit of the inverter 7 is monitoring the state of the winding-switching-section abnormal signal 264, the control unit of the inverter 7 determines that an abnormality has occurred and can stop the operation of the main circuit unit of the inverter 7.

In the present embodiment, each state detector detects the conducting/non-conducting state of the power semiconductor switches of the switching unit, and an output signal from the state detector is compared with a drive signal that drives the switching unit. This makes it possible to detect an abnormality, such as erroneous wiring of the winding switching section or a failure of the switching unit. It is thus possible to provide a winding switching apparatus capable of preventing itself from being damaged.

With the embodiments described above, it is possible to realize a motor drive operation adaptable to a wide range of constant output characteristics. The present invention is thus applicable to main-shaft driving devices for machine tools and to vehicle driving devices for hybrid vehicles and electric vehicles.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A winding switching apparatus for switching windings of an AC three-phase motor, the winding switching apparatus comprising:

an AC three-phase motor having windings for the respective three phases, the windings each having an intermediate tap, a winding start terminal, and a winding end terminal that are provided outside the AC three-phase motor;

an inverter configured to supply a variable voltage having a variable frequency to the winding start terminals;

a plurality of winding switching sections configured to switch the intermediate taps and the winding end terminals; and a plurality of drive circuits each configured to receive a drive signal from the inverter and control the corresponding winding switching section, wherein the winding switching sections each include:

a diode unit having three diodes whose cathodes are connected to each other;

a switching unit having three power semiconductor switches and three diodes connected in inverse parallel to the respective power semiconductor switches, wherein emitters of the respective power semiconductor switches are connected to each other, collector of the respective power semiconductor switches are connected to respective anodes of the diodes of the diode unit, and connection points between the respective collectors of the power semiconductor switches and the corresponding anodes of the diodes of the diode unit are connected to the respective winding end terminals or to the respective intermediate taps;

a potential fixing unit having a positive-side charging resistor, a capacitor, and a negative-side charging resistor, wherein one end of the positive-side charging resistor is connected to a positive-side DC bus of the inverter, the other end of the positive-side charging resistor is connected to a positive side of the capacitor, a negative side of the capacitor is connected to one end of the negative-side charging resistor, the other end of the negative-side charging resistor is connected to a negative-side DC bus of the inverter, and the positive side of the capacitor is connected to the cathodes of the respective diodes of the diode unit; and a protective diode unit having three diodes whose anodes are connected to the negative side of the capacitor of the potential fixing unit and whose cathodes are connected to the respective connection points between the respective anodes of the diodes of the diode unit and the corresponding collectors of the power semiconductor switches of the switching unit.

2. The winding switching apparatus according to claim 1, further comprising:

a plurality of state detectors each configured to detect a conducting state of the power semiconductor switches of the corresponding switching unit; and a plurality of comparators each configured to detect an abnormality in the corresponding winding switching section on the basis of output signals from the corresponding state detector and the drive signal.

3. The winding switching apparatus according to claim 2, wherein the state detector detects that all the power semiconductor switches are in a conducting state and that all the power semiconductor switches are in a non-conducting state.

4. The winding switching apparatus according to claim 2, wherein the state detector has an insulating function.

5. The winding switching apparatus according to claim 3, wherein the comparator includes a plurality of logical exclusive OR circuits each configured to compare an output signal from the corresponding state detector with the drive signal to output a logical exclusive OR signal, and uses the logical exclusive OR signals from the logical exclusive OR circuits to detect an abnormality in the corresponding winding switching section.

* * * * *